(No Model.)
E. T. & D. HIGHAM.
DYNAMO ELECTRIC MACHINE.
No. 349,716. Patented Sept. 28, 1886.
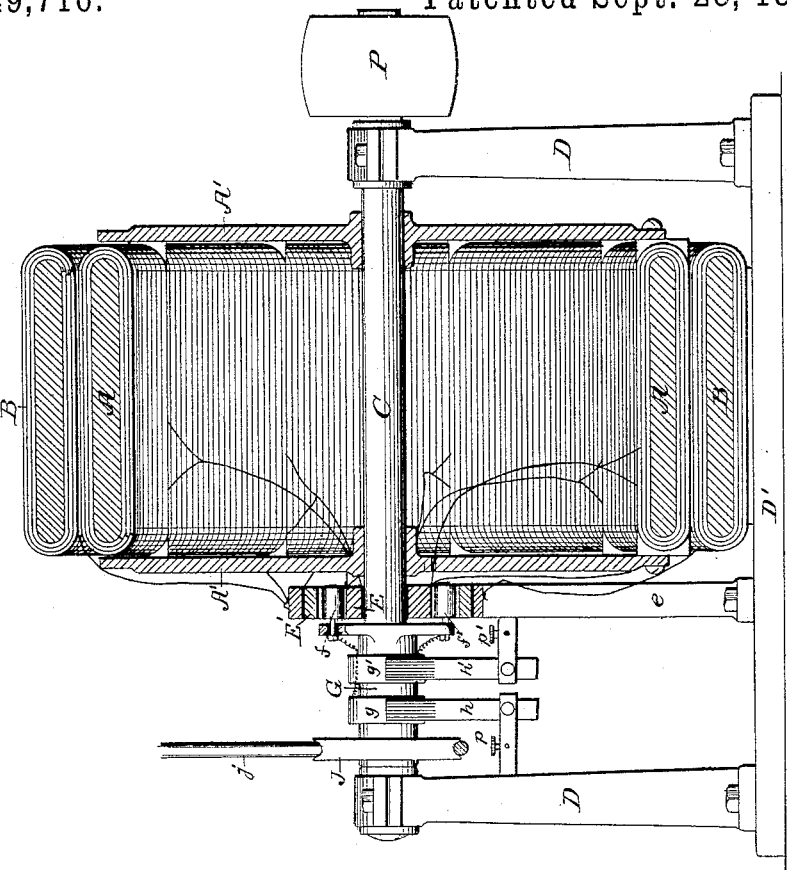
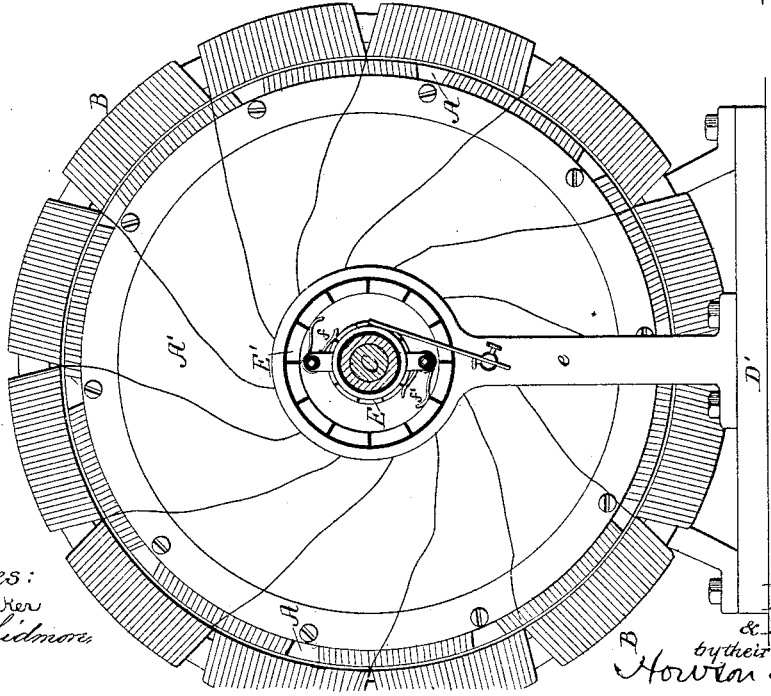
Witnesses:
John E. Parker
Jas. L. Skidmore
Inventors
E. T. Higham
& D. Higham
by their Attorneys
Howson and Sons

UNITED STATES PATENT OFFICE.

ENOS T. HIGHAM AND DANIEL HIGHAM, OF PHILADELPHIA, PA., ASSIGNORS OF ONE-THIRD TO JAMES M. JONES, OF SAME PLACE.

DYNAMO-ELECTRIC MACHINE.

SPECIFICATION forming part of Letters Patent No. 349,716, dated September 28, 1886.

Application filed January 6, 1886. Serial No. 187,776. (No model.)

*To all whom it may concern:*

Be it known that we, ENOS T. HIGHAM and DANIEL HIGHAM, citizens of the United States, residing in Philadelphia, Pennsylvania, have invented certain Improvements in Dynamo-Electric Machines and Mode of Operating the Same, of which the following is a specification.

The object of our invention is to so construct and operate a dynamo-electric machine that it will give the highest efficiency, and this object we attain in the manner which we will now proceed to describe.

In the accompanying drawings, Figure 1 is a side view with the outer end of the axis in section, and Fig. 2 is a vertical section of the machine.

In general construction the dynamo-electric machine illustrated in the drawings is very similar to the electric motor shown and described in the application for Letters Patent filed by us November 21, 1885, Serial No. 183,523. There are two Gramme rings—one fixed, which constitutes the field-magnet, and one rotary, which constitutes the armature. In the present instance the inner ring, A, is the rotary armature, while the outer ring, B, is the field-magnet, and is suitably fixed on the base-plate D'. The rotating armature A is carried by a pair of disks, A' A', mounted on the axis C, which has its bearings in the opposite standards D D, mounted on the base-plate D'. The terminals from the coils of the rotary armature are connected to the insulated segments E on the armature-shaft C, while the terminals from the field-magnet coils are connected to the insulated segments E', arranged within the upper ring-like end of a post, e. The brackets supporting the two binding-posts p p', to which the line-wires are to be connected, carry, also, two brushes, h h', which bear on the insulated rings g g', respectively, and which are carried by a sleeve, G, free to turn on the axis C. This sleeve carries the insulated contacts, which in our electric motor were shown as consisting of disks or wheels; but in our present machine they are pairs of brushes, f f', and the contact-faces of the commutator-segments are flat instead of flanged, as in the electric motor. One of these pairs of contact-brushes, f, is electrically connected to the insulated ring g, while the other pair of brushes, f', is electrically connected to the insulated ring g'.

In our present invention we so operate the machine that the polar points of the armature and the field-magnet are caused to rotate mechanically in a direction contrary to that in which the rotary armature moves mechanically, so that the speed of rotation of the armature-coils past the polar points of the field will be increased and the efficiency of the machine consequently increased. For carrying this method of operation into effect, we provide the sleeve which carries the commutator-contacts with a gear-wheel, pulley, or other device, whereby a positive motion may be imparted to the sleeve in a direction contrary to that in which the armature-shaft is driven by its pulley p at the opposite end. In the present instance we have shown the sleeve as provided with a flanged pulley, J, and a driving-belt, j. The speed of rotation of this sleeve may be such in relation to that of the main shaft as will give the best results. In fact, by varying the speed at which the sleeve is driven in relation to the speed of the armature the current may be regulated.

We claim as our invention—

1. The mode herein described of operating a dynamo-electric machine having a stationary field-magnet and a rotary armature, said mode consisting in electrically rotating the polar points of the field-magnet and armature in a direction contrary to that in which the armature rotates mechanically, substantially as set forth.

2. A dynamo-electric machine having a fixed field-magnet and a movable armature, in combination with commutating devices for electrically rotating the polar points of the field-magnet and armature in a direction contrary to that in which the armature rotates mechanically.

3. The combination of the armature and field-magnet of a dynamo-electric machine and commutators and contacts for both armature and field-magnet with devices, substantially as set forth, to rotate the commutator-contacts.

4. The combination of the armature and field-magnet of a dynamo-electric machine and commutators for both with brushes for both commutators and a wheel or pulley to rotate the said brushes, substantially as specified.

In testimony whereof we have signed our names to this specification in the presence of two subscribing witnesses.

ENOS T. HIGHAM.
DANIEL HIGHAM.

Witnesses:
WILLIAM F. DAVIS,
HARRY SMITH.